US012797749B2

(12) United States Patent
Palm et al.

(10) Patent No.: US 12,797,749 B2
(45) Date of Patent: Nov. 17, 2026

(54) MULTI-USER SHARED MIXED REALITY SYSTEMS AND METHODS

(71) Applicant: Resolution Games AB, Stockholm (SE)

(72) Inventors: Tommy Palm, Stockholm (SE); Fadi Botoros, Stockholm (SE); Niklas Persson, Stockholm (SE)

(*) Notice: Subject to any disclaimer, the term of this patent is extended or adjusted under 35 U.S.C. 154(b) by 142 days.

(21) Appl. No.: 18/432,759

(22) Filed: Feb. 5, 2024

(65) Prior Publication Data

US 2024/0307784 A1 Sep. 19, 2024

Related U.S. Application Data

(60) Provisional application No. 63/452,541, filed on Mar. 16, 2023.

(51) Int. Cl.

*A63F 13/79* (2014.01)
*A63F 13/213* (2014.01)

(Continued)

(52) U.S. Cl.

CPC ............ *A63F 13/79* (2014.09); *A63F 13/213* (2014.09); *A63F 13/537* (2014.09); *G06F 3/011* (2013.01);

(Continued)

(58) Field of Classification Search

CPC ...... A63F 13/79; A63F 13/213; A63F 13/537; A63F 2300/8082; G06T 19/00; G06T 2219/024; H04L 65/1069; G06F 3/011

(Continued)

(56) References Cited

U.S. PATENT DOCUMENTS 11,676,355 B2 * 6/2023 Palmaro .................. A63F 13/53 345/419
2019/0313059 A1 * 10/2019 Agarawala .............. G06F 3/011

(Continued)

OTHER PUBLICATIONS

"Build Local Multiplayer Experiences with Shared Spatial Anchors on Meta Quest", Dec. 15, 2022, 9 pages, retrieved from https://developers.meta.com/horizon/blog/build-local-multiplayer-experiences-shared-spatial-anchors/ (Year: 2022).*

(Continued)

*Primary Examiner* — James D Nigh
(74) *Attorney, Agent, or Firm* — Barcelo, Harrison & Walker LLP

(57) ABSTRACT

Multi-user shared mixed reality devices, methods, and systems are disclosed. The disclosure includes a plurality of head-mounted mixed reality systems, interconnected through a network that may also include a central server. A first user defines the boundaries of a first room containing said first user, as well as the boundaries of one or more objects within said room. Said first user also defines the location and/or boundaries of an inter-user window for sharing mixed reality elements with other users. Additional users perform similar definitional steps. Multi-user matchmaking is performed, comprises virtually stitching together a virtual version of a first physical room associated with said first user with a virtual version of a second physical room associated with a second user at a location where a first virtual inter-user window and a second virtual inter-user window coincide. Various combinations of the disclosed devices, methods, and systems may be implemented.

12 Claims, 8 Drawing Sheets

(51) Int. Cl.

| | |
|---|---|
| ***A63F 13/537*** | (2014.01) |
| ***G06F 3/01*** | (2006.01) |
| ***G06T 19/00*** | (2011.01) |
| ***H04L 65/1069*** | (2022.01) |

(52) U.S. Cl.
CPC .......... *G06T 19/00* (2013.01); *H04L 65/1069* (2013.01); *A63F 2300/8082* (2013.01); *G06T 2219/024* (2013.01)

(58) Field of Classification Search
USPC ............................................................ 463/31
See application file for complete search history.

(56) References Cited

U.S. PATENT DOCUMENTS

| | | | | |
|---|---|---|---|---|
| 2020/0252585 | A1* | 8/2020 | Zhou | H04N 7/147 |
| 2020/0304375 | A1* | 9/2020 | Chennai | G06T 7/70 |
| 2022/0124143 | A1* | 4/2022 | Rafkind | H04L 65/403 |
| 2022/0139055 | A1* | 5/2022 | Palmaro | A63F 13/245<br>345/419 |
| 2022/0198765 | A1* | 6/2022 | Nickerson | H04L 67/131 |
| 2022/0326837 | A1* | 10/2022 | Dessero | G06F 3/011 |
| 2023/0419618 | A1* | 12/2023 | Krenn | G06F 3/0483 |
| 2024/0028177 | A1* | 1/2024 | Pastrana Vicente | G06F 3/011 |
| 2024/0119680 | A1* | 4/2024 | Gunnarsson | G06F 3/04815 |
| 2024/0160272 | A1* | 5/2024 | Soryal | G06F 3/011 |

OTHER PUBLICATIONS

Milgram et al. "A Taxonomy of Mixed Reality Visual Displays", IEICE Trans. Inf. & Syst., vol. E77-D, No. Dec. 12, 1994, pp. 1321-1329 (Year: 1994).*

Introduction to Rooms and Portals, retrieved from Internet Archive scraped on Jan. 29, 2023, 3 pages (Year: 2023).*

Cao et al. Mobile Augmented Reality: User Interfaces, Frameworks and Intelligence, retrieved from arXiv:2106.08710v1, Jun. 16, 2021, pp. 111:1 to 111:35 (Year: 2021).*

BasuMallick What is Mixed Reality? Definition, Working and Applications, retrieved from https://www.spiceworks.com/tech/innovation/articles/mixed-reality/, Dec. 6, 2022, 23 pages (Year: 2022).*

* cited by examiner

700

MULTI-USER SHARED MIXED REALITY SYSTEMS AND METHODS

CROSS-REFERENCE TO RELATED APPLICATION

This application claims the benefit of Provisional Application Ser. No. 63/452,541 filed 16 Mar. 2023, the contents of which are herein incorporated by reference in their entirety for all purposes.

CROSS-REFERENCE TO RELATED APPLICATION

Field of the Disclosure

This disclosure relates generally to digital imaging. More particularly, without limitation, certain embodiments relate to systems and methods that may be used in mixed reality multi-user environments and related technologies.

General Background

Mixed reality (MR) systems combine elements of both virtual reality (VR) and augmented reality (AR). In MR, digital objects are overlaid onto the physical world in a way that allows users to interact with both the real and virtual environments. This may create a sense of immersion and presence that can be used for a variety of applications, such as gaming, education, and training.

Some commercial examples of MR systems include the Microsoft HoloLens, the Magic Leap One, and the Meta Quest/Quest Pro. These systems typically consist of a headset or glasses that are equipped with cameras and sensors to track users' movements and the environment around them. The MR system then typically renders and overlays digital objects onto a user's field of view, creating a blending of the real and virtual worlds that may appear to a user to be seamless.

As just one example of a mixed reality application, "Spatial Ops" is a mixed reality multiplayer game developed by Resolution Games, AB, which is designed to test and improve players' spatial awareness and problem-solving skills. In the game, players take on the role of a member of a futuristic space crew tasked with navigating through complex and dangerous environments. Players must use their wits, reflexes, and spatial awareness to navigate through a series of increasingly challenging levels, avoiding obstacles, solving puzzles, and defeating enemies along the way. The game features a range of different environments, including futuristic cities, space stations, and alien worlds, each with its own unique challenges and hazards. Players can move around freely in the game world using a variety of different movement options, including teleportation and free movement. As an example, with Spatial Ops, multiple players (e.g., up to eight players in some implementations) can transform a real-world space into what appears to be an urban battlefield and then team up with or against other players in a first-person shooter (FPS) game experience.

Technology known to skilled artisans uses VR, AR, and/or MR to designate or define points or objects in the physical world that can be digitally tagged or annotated. These tags can then be used to overlay digital content onto the physical environment. Such tags (sometimes referred to as spatial anchors) may be shared across multiple users and devices, enabling different users to experience the same digital content or interact with the same spatial anchors, even if they are in different physical locations.

There is a need to provide innovations in the above technologies to enhance multi-player experiences. It is therefore desirable to address the limitations in the known art by means of the systems and methods described herein.

BRIEF DESCRIPTION OF THE DRAWINGS

By way of example, reference will now be made to the accompanying drawings, which are not to scale.

DETAILED DESCRIPTION

Figure 1:
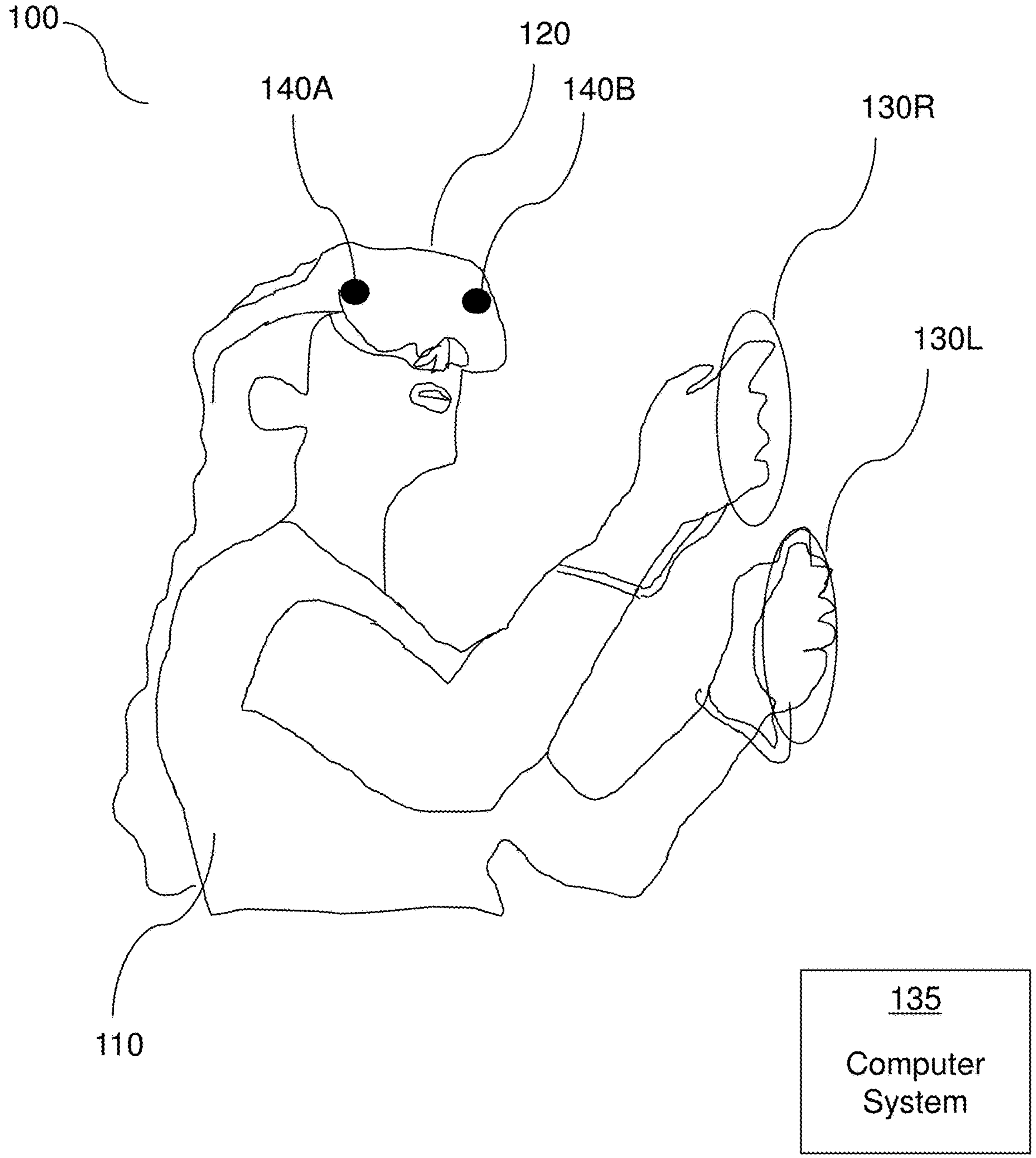
FIG. 1 depicts one view of a mixed reality system worn by a human user that may be used in accordance with aspects of certain embodiments of the present invention.

Those of ordinary skill in the art will realize that the following description of the present invention is illustrative only and not in any way limiting. Other embodiments of the invention will readily suggest themselves to such skilled persons upon their having the benefit of this disclosure. Reference will now be made in detail to specific implementations of the present invention, as illustrated in the accompanying drawings. The same reference numbers will be used throughout the drawings and the following description to refer to the same or like parts.

Certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions that execute on the computer or other programmable apparatus create structures for implementing the functions specified in the flow chart block or blocks. These computer program instructions may also be stored in computer-readable memory that can direct a computer or other programmable apparatus to function in a particular manner, such that the instructions stored in computer-readable memory produce an article of manufacture including instruction structures that implement the function specified in the flow chart block or blocks. The computer program instructions may also be loaded onto a computer or other programmable apparatus to cause a series of operational steps to be performed on the computer or other programmable apparatus to produce a computer-implemented process such that the instructions that execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems that perform the specified functions or steps, or combinations of special purpose hardware and computer instructions.

For example, any number of computer programming languages, such as C, C++, C #(CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher-level programming languages to generate sets of machine instructions that may be executed by one or more processors to perform a programmed function or set of functions.

In the descriptions in this document, certain embodiments are described in terms of particular data structures, preferred and optional enforcements, preferred control flows, and examples. Other and further applications of the described methods, as would be understood after review of this application by those with ordinary skill in the art, are within the scope of the claimed invention.

The term "machine-readable medium" should be understood to include any structure that participates in providing data that may be read by an element of a computer system. Such a medium may take many forms, including but not limited to, non-volatile media, volatile media, and transmission media. Non-volatile media include, for example, optical or magnetic disks and other persistent memory such as devices based on flash memory (such as solid-state drives, or SSDs). Volatile media include dynamic random access memory (DRAM) and/or static random access memory (SRAM). Transmission media include cables, wires, and fibers, including the wires that comprise a system bus coupled to a processor. Common forms of machine-readable media include, for example and without limitation, a floppy disk, a flexible disk, a hard disk, a solid-state drive, a magnetic tape, any other magnetic medium, a CD-ROM, a DVD, or any other optical medium.

As used herein, the term "computer system" is defined to include one or more processing devices (such as a central processing unit ("CPU") or graphics processing unit ("GPU")) for processing data and instructions that are coupled with one or more data storage devices for exchanging data and instructions with the processing unit, including, but not limited to, RAM, ROM, internal SRAM, on-chip RAM, on-chip flash, CD-ROM, hard disks, and the like. Examples of computer systems include everything from a controller to a laptop or desktop computer, to a supercomputer. The data storage devices can be dedicated, i.e., coupled directly with the processing unit, or remote, i.e., coupled with the processing unit over a computer network. It should be appreciated that remote data storage devices coupled to a processing unit over a computer network can be capable of sending program instructions to the processing unit for execution. In addition, the processing device can be coupled with one or more additional processing devices, either through the same physical structure (e.g., a parallel processor), or over a computer network (e.g., a distributed processor.). The use of such remotely coupled data storage devices and processors will be familiar to those of skill in the computer science arts. The term "computer network" as used herein is defined to include a set of communications channels interconnecting a set of computer systems that can communicate with each other. The communications channels can include transmission media such as, but not limited to, twisted pair wires, coaxial cable, optical fibers, satellite links, or digital microwave radio. The computer systems can be distributed over large, or "wide," areas (e.g., over tens, hundreds, or thousands of miles, WAN), or local area networks (e.g., over several feet to hundreds of feet, LAN). Furthermore, various local-area and wide-area networks can be combined to form aggregate networks of computer systems.

FIG. 1 depicts relevant components of a mixed reality system 100 worn by a human user 110 that may be used in accordance with aspects of certain embodiments of the present invention. As depicted in FIG. 1, exemplary mixed reality system 100 comprises a head-mounted display device 120 (also sometimes referred to as a headset), two hand-held controllers (130L and 130R), and one or more computing systems 135. In certain embodiments that implement hand-tracking, for example, hand-held controllers (130L and/or 130R) may not be required or incorporated.

Mixed reality system 100 may also comprise additional components (not shown), such as tracking devices, microphones, headphones, and the like. Depending on the particular requirements of each implementation, computing system 135 may be configured as a separate desktop or laptop computer, a mobile or cell phone, or any of any number of other embodiments known to skilled artisans. Alternatively, computing system 135 may be integrated into head-mounted display system 120. Computing system 135 communicates with the components of mixed reality system 100, either wirelessly or with one or more wired connections, in accordance with techniques that are well-known to skilled artisans. Mixed reality system 100 may include a network connection to enable downloading software updates or accessing online content, as well as to facilitate communication, without limitation, with remote servers or other users.

As is well-known to skilled artisans, display device 120 may be mounted on the user's head so as to cover the user's eyes, and may provide visual content to the user 110 through display devices within the headset that are facing the user's eyes (not shown in FIG. 1). The head-mounted display device 120 may comprise two separate internal displays, one for each of the user's eyes, and may provide an immersive experience for the user 110. Head-mounted display device 120 may include sensors and cameras to track the user's movements and adjust the display in response to those movements. Such sensors may include accelerometers, gyroscopes, and magnetometers. Hand-held controllers 130L and 130R allow the user to interact with the virtual environment displayed by head-mounted display device 120, and these controllers may include, without limitation, a variety of buttons, touchpads, or joysticks for input. Mixed reality system 100 may comprise hand-tracking technology, which eliminates the need for controllers such as controllers 130L and 130R in certain embodiments.

To enable the user 110 to see the surrounding real-world environment, head-mounted display device 120 may comprise an image passthrough feature, as known in the art. Specifically, to enable the user 110 to perceive their physical surroundings while wearing the head-mounted display device 120, one or more cameras may be implemented into the head-mounted display device 120, such as outward-facing cameras 140A and 140B that are depicted in FIG. 1. The outward-facing cameras (e.g., 140A and 140B) may be configured to capture still or video images of the physical environment around the user 110. Utilizing techniques known to skilled artisans, the images that are displayed to the user with a mixed-reality system as described herein may comprise a combination of a depiction of the real-world actual physical environment surrounding user 110 and virtual, or digitally created images such as avatars, characters, virtual objects, weapons, information panels, and the like.

In certain embodiments, instead of a head-mounted display device (such as device 120 as shown in FIG. 1), a mobile phone or mobile tablet or other display device may be incorporated. In a mobile-phone-based system, for example, the mobile device's cameras and other sensors may be used to overlay computer-generated content onto the user's view of the real world. One common implementation of MR on mobile phones is through the use of commercially available software development kits ("SDKs") that enable developers to create mixed reality experiences for mobile devices, such as ARKit (for iOS devices) and ARCore (for Android devices). Such SDKs enable mobile phones to use their cameras to detect and track real-world objects, and then use this information to render three-dimensional ("3D") graphics or other digital content onto the display, overlaid with the user's view of the real world through the mobile phone's display. With such systems, for example, users may use their mobile phones to locate and capture virtual creatures that appear to be living in the real world, or preview how furniture would look in their home before making a purchase (e.g., by pointing their mobile phone's camera at the space where they want to place the furniture and can see a 3D model of the furniture overlaid onto the real-world environment).

Figure 2:
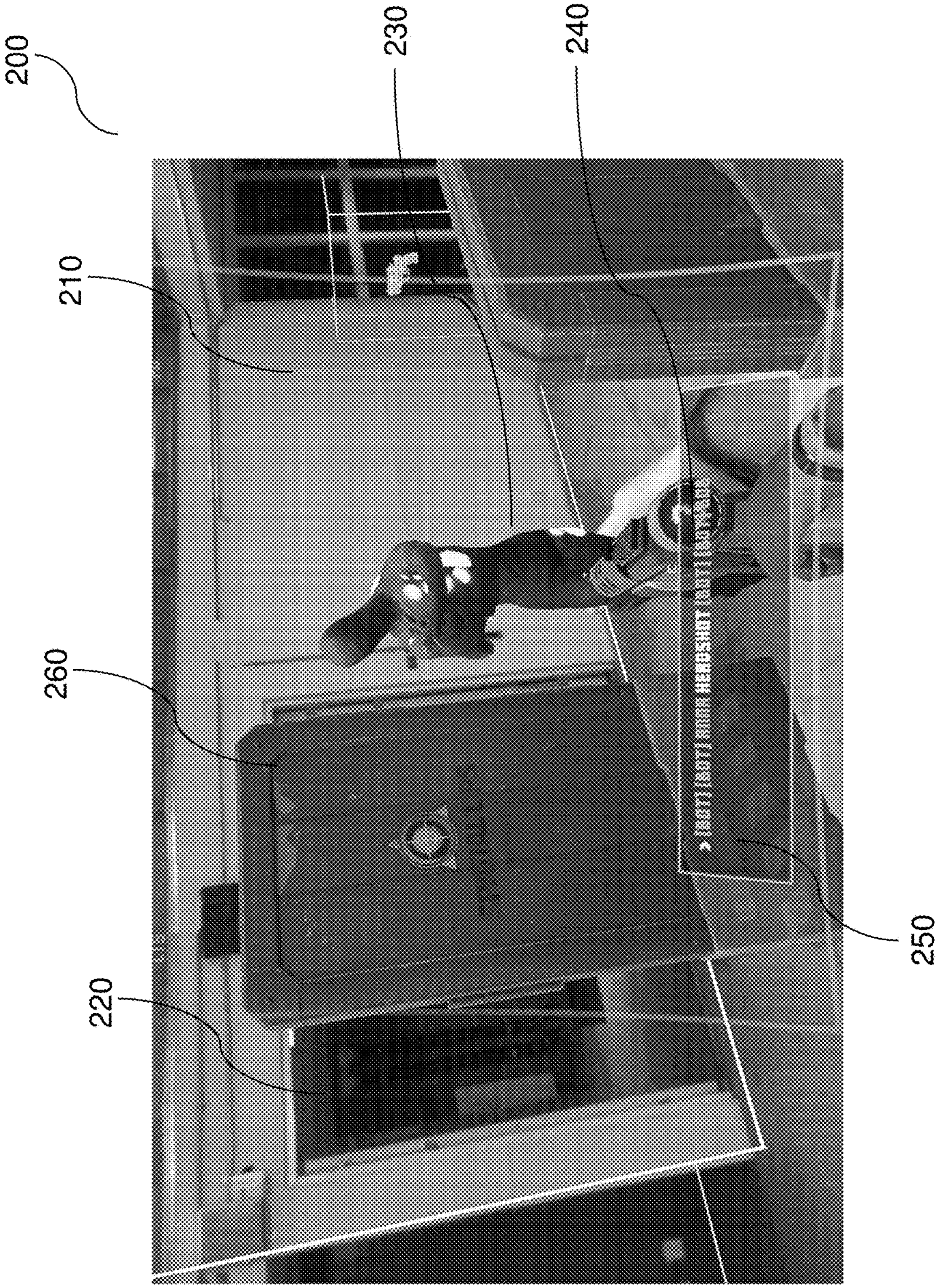
FIG. 2 depicts an exemplary image as seen through a user of a mixed reality system, in accordance with aspects of certain embodiments of the present invention.

FIG. 2 depicts an exemplary image as seen through a user of a mixed reality system (such as user 110 as shown in FIG. 1), in accordance with aspects of certain embodiments of the present invention. For the sake of simplicity, FIG. 2 depicts the image that may be displayed to one of the user's eyes. Certain aspects of the displayed image, such as wall portion 210 and doorway 220, may depict photographic renditions of the user's actual real-world environment as captured by cameras (such as outward-facing cameras 140A and 140B depicted in FIG. 1). Other aspects of the image displayed in FIG. 2, such as enemy character 230, weapon 240, and information panel 250, may be digitally generated as virtual objects that appear on the display. In this way, a "mixed reality" of actual and virtual objects is rendered and displayed to the user, creating an immersive visual experience that is a combination of real and virtual objects.

Figure 3:
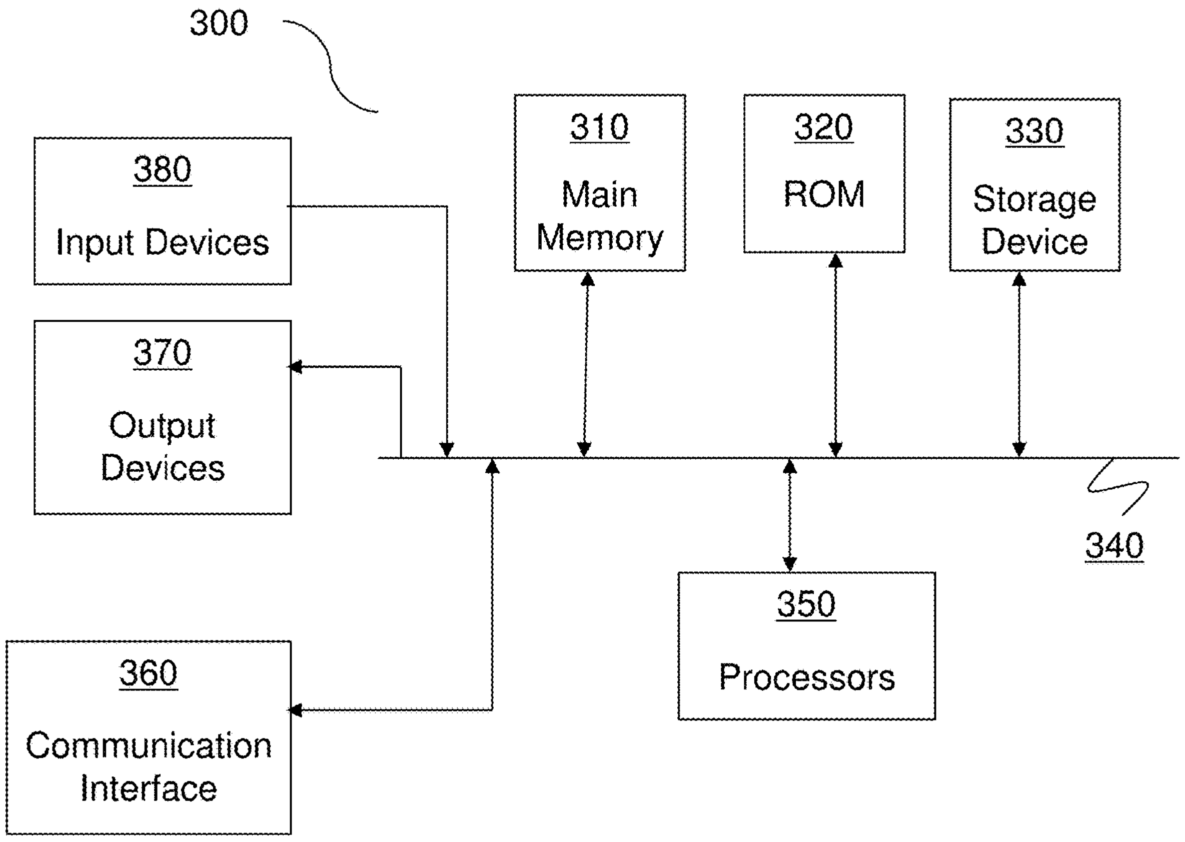
FIG. 3 is an exemplary block diagram of a computing system that may be used to implement aspects of certain embodiments of the present invention.

FIG. 3 is an exemplary block diagram of a computing system 300 that may be used to implement aspects of certain embodiments of the present invention (such as computer system 135 depicted in FIG. 1). Computing device 300 may include, without limitation, a bus 340, one or more processors 350, main memory 310, a read-only memory (ROM) 320, a storage device 330, one or more input devices 380, one or more output devices 370, and a communication interface 360. Bus 340 may include, without limitation, one or more conductors that permit communication among the components of computing device 300.

Processors 350 may include, without limitation, any type of conventional processors, microprocessors, CPUs, GPUs, or processing logic that interprets and executes instructions. Main memory 310 may include, without limitation, a random-access memory (RAM) or another type of dynamic storage device that stores information and instructions for execution by processor 350. ROM 320 may include, without limitation, a conventional ROM device or another type of static storage device that stores static information and instructions for use by processors 350. Storage device 330 may include, without limitation, a magnetic and/or optical recording medium and its corresponding drive.

Input device(s) 380 may include, without limitation, one or more conventional mechanisms that permit a user to input information to computing device 300, such as a keyboard, a mouse, a pen, a stylus, handwriting recognition, voice recognition, biometric mechanisms, touch screen, and the like (e.g., controllers 130L and 130R as depicted in FIG. 1). Output device(s) 370 may include, without limitation, one or more conventional mechanisms that output information to the user, including a display, a printer, a speaker, and the like (e.g., head-mounted display 120 as depicted in FIG. 1). Communication interface 360 may include, without limitation, any transceiver-like mechanism that enables computing device 300 to communicate with other devices and/or systems. For example, communication interface 360 may include, without limitation, mechanisms for communicating with another device or system via a network.

As described in detail herein, computing device 300 may perform operations based on software instructions that may be read into memory 310 from another computer-readable medium, such as data storage device 330, or from another device via communication interface 360. The software instructions contained in memory 310 cause one or more processors 350 to perform processes that are described elsewhere. Alternatively, hardwired circuitry may be used in place of, or in combination with, software instructions to implement processes consistent with the present invention. Thus, various implementations are not limited to any specific combination of hardware circuitry and software.

Figure 4:
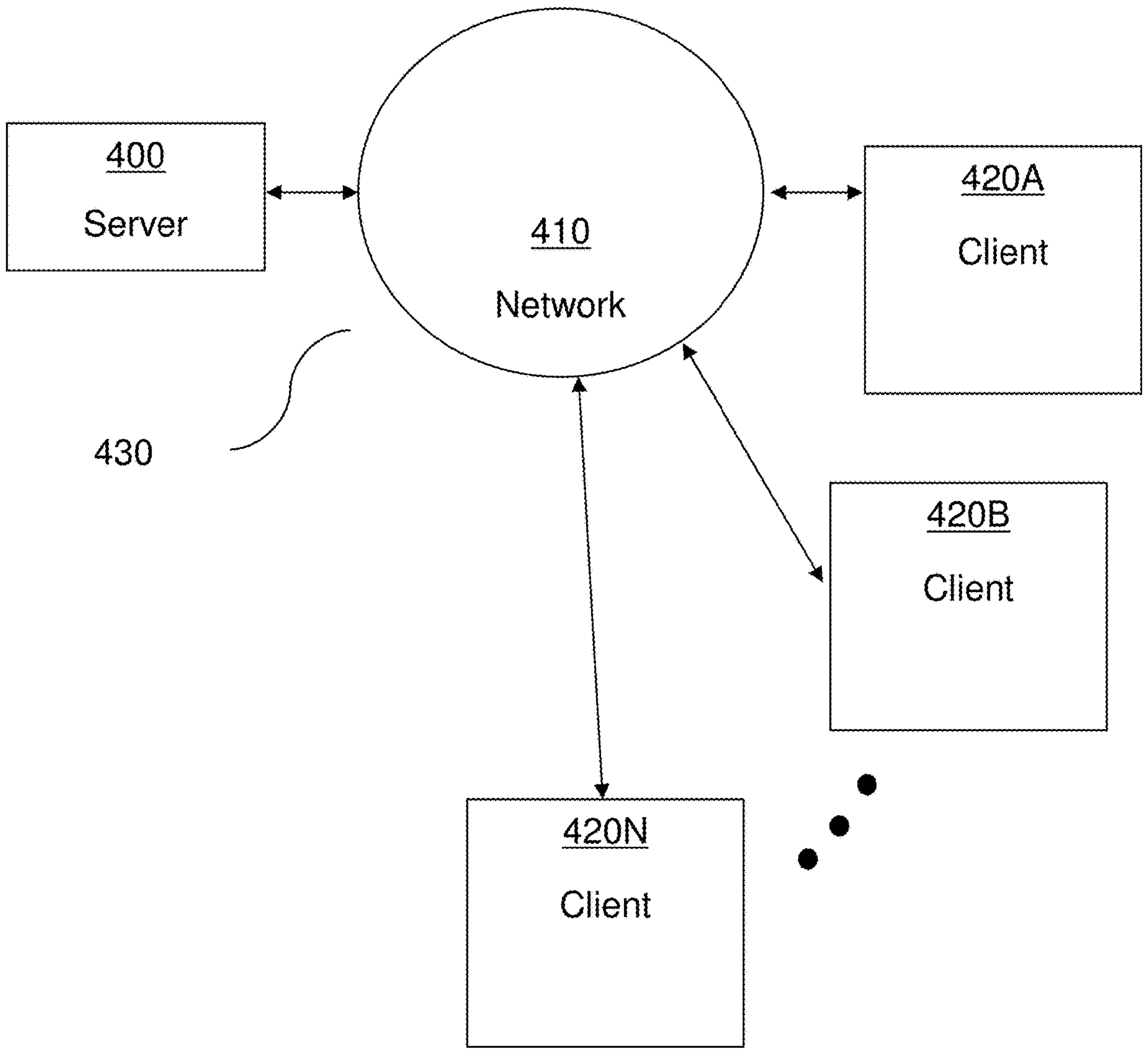
FIG. 4 depicts an exemplary networked environment in which systems and methods, consistent with exemplary embodiments of the present invention, may be implemented.

FIG. 4 depicts an exemplary networked environment 430 in which systems and methods, consistent with exemplary embodiments of the present invention, may be implemented. As illustrated, networked environment 430 may include, without limitation, a server (400), one or more clients (420A-420N), and a network (410). The exemplary simplified number of servers (400), clients (420A-420N), and networks (410) illustrated in FIG. 4 can be modified as appropriate in a particular implementation. In practice, there may be additional servers (400), clients (420), and/or networks (410).

In certain embodiments, a client 420 may connect to network 410 via wired and/or wireless connections, and thereby communicate or become coupled with server 400, either directly or indirectly. Alternatively, client 420 may be associated with server 400 through any suitable tangible computer-readable media or data storage device (such as a disk drive, CD-ROM, DVD, or the like), data stream, file, or communication channel.

Network 410 may include, without limitation, one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, a cellular network, and/or another type of suitable network, depending on the requirements of each particular implementation.

One or more components of networked environment 430 may perform one or more of the tasks described as being performed by one or more other components of networked environment 430.

Details regarding the foregoing components (e.g., as depicted in FIGS. 3 and 4), which may be implemented in a single computing device or distributed among multiple computing devices, are described throughout this document.

Certain embodiments of the present invention may be implemented in the context of a networked multiplayer environment such as a computer game. As is well-known to skilled artisans, such a game requires a multiplayer networking system that can connect players to each other and allow them to interact within the same virtual environment. Among other requirements, such a system should typically be able to handle multiple players, provide reliable connectivity, and minimize latency to ensure smooth gameplay. Such a game also requires a game server to manage the multiplayer environment and store data related to the players' progress and interactions. The server should be powerful enough to handle multiple players at once and provide a stable and secure environment for gameplay. Furthermore, the game should be designed with multiple players in mind, with mechanics and gameplay elements that encourage social interaction and collaboration between players. Finally, without limitation, the game should provide players with a way to communicate with each other during gameplay, either through voice chat or text chat.

Figure 5:
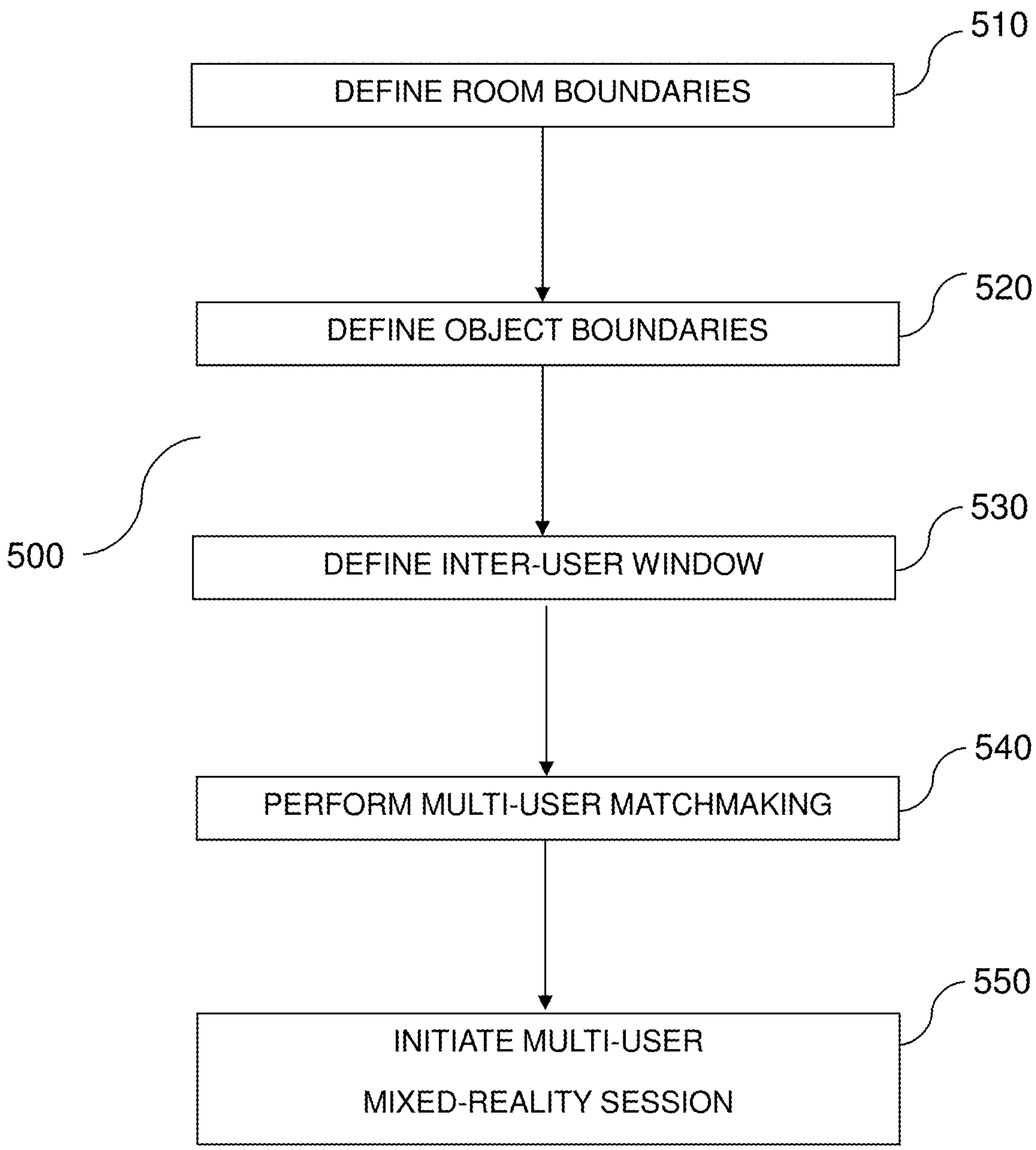
FIG. 5 depicts an exemplary flow chart for room and calibration and inter-user window initialization methods according to aspects of certain embodiments of the present invention.

FIG. 5 depicts an exemplary flow chart for room and calibration and inter-user window initialization methods according to aspects of certain embodiments of the present invention.

In the first step (510), a user (such as user 110 depicted in FIG. 1) defines the boundaries of the room in which he or she is located, using techniques known to skilled artisans. The room calibration process involves setting up the boundaries of the virtual environment and adjusting the headset's sensors to match the physical environment of the room. For example, user 110 may cause mixed-reality system 100 to enter room calibration mode, then walk around the edges of the room while holding a controller (e.g., controller 130L or 130R) and activating a predetermined button or other input device on the controller. In certain embodiments that implement object detection sensor technology, room calibration step 510 may be performed semi-automatically or automatically by mixed reality system 120, with little or no manual input or other information from a user required. Among other objectives, room calibration step 510 typically establishes a virtual boundary around the user's physical play space to keep the user safe and prevent the user from bumping into objects in the real world, among other objectives.

At step (520), the user defines the boundaries of one or more objects within the relevant room. For example, a desk may rest on the floor of the room at a specific fixed location, and the user may hold a controller (e.g., controller 130L or 130R) and move it around the edges of the object while activating a predetermined button or other input device on the controller. In a virtual version of the object, such as the desk described in the preceding sentence, the object may appear as a rectangular prism (e.g., a box) or other simplified form, approximately the same size as the real-world object and approximately at the same location as the real-world-object. For example, referring to FIG. 2, obstacle 260 may appear to a user wearing a head-mounted mixed-reality display device as a virtual vertical obstacle or protective wall, but it may actually represent a real-world object of approximately the same size and at approximately the same location (e.g., obstacle 260 may be the virtual representation of a real-world vertical mirror or wardrobe at the same location and of approximately the same size).

Referring back to FIG. 5, at step (530), the user defines an inter-user window with the room in which the user is located. For example, the user may designate a defined area within a specific wall of the room in which the user is located as the inter-user window. Further details regarding this step (530) are provided later in this document.

At step (540), multi-user match-making is performed with the objective of associating the current user with another user who also has defined an inter-user window as described above. Once this multi-player match-making step has been performed, the rooms in which both users are located are virtually "stitched" together at the location of the inter-user window, such that the second user may virtually "see" into the first user's room (e.g., the second user may see a virtual representation of the first user, a visual representation of portions of the room in which the first user is located, and a virtual representation of one or more objects within the room in which the first user is located).

At step (540), a multi-user mixed-reality session (e.g., a game) is initiated that includes at least both of the users described above with reference to step (540).

Figure 6:
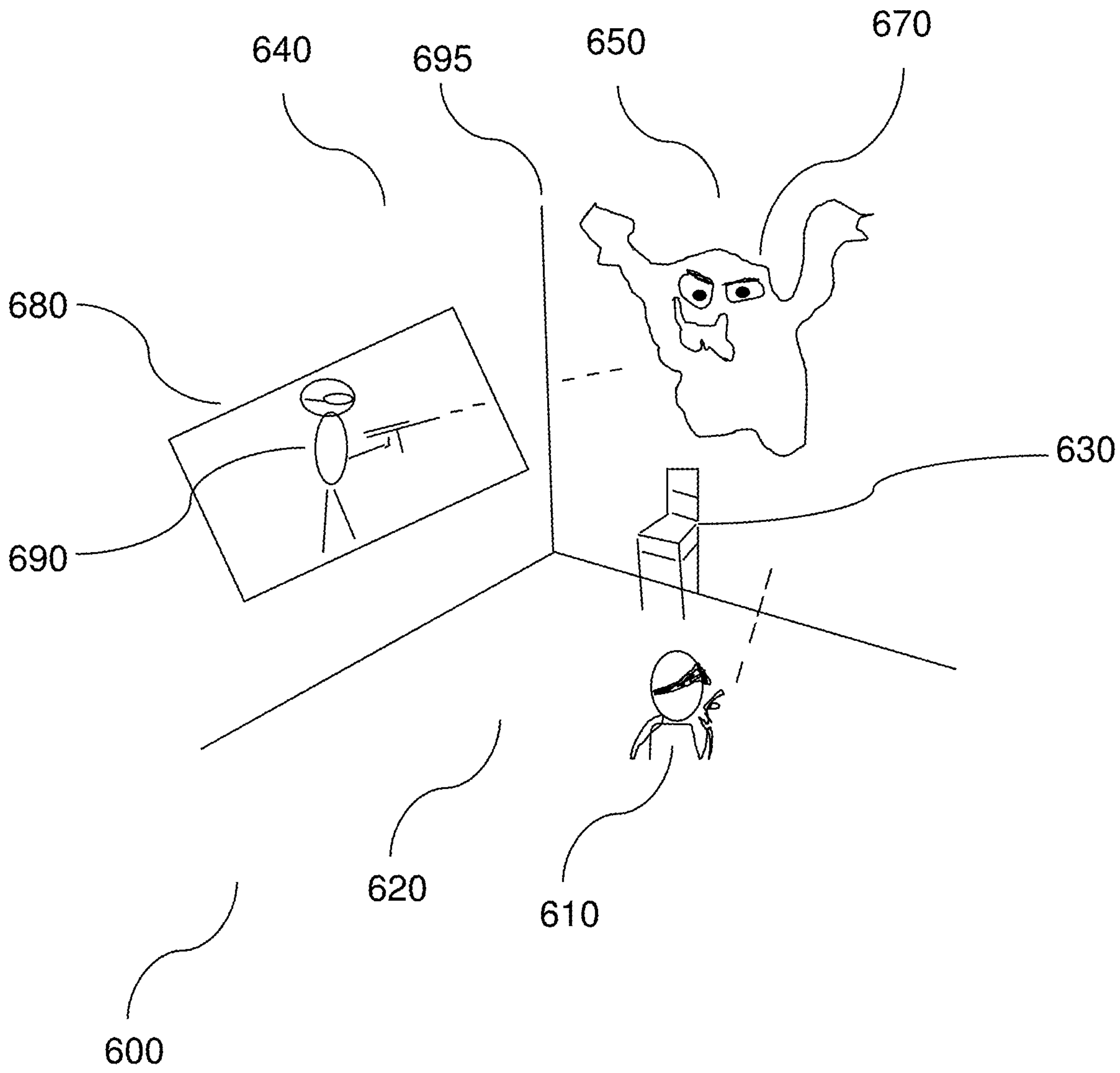
FIG. 6 depicts an exemplary arrangement utilizing aspects of the present invention in certain embodiments.

FIG. 6 depicts an exemplary arrangement (600) utilizing aspects of the present invention in certain embodiments, after the steps described above with respect to FIG. 5 have been performed. As shown in FIG. 6, a first user (610) wears a head-mounted mixed reality display system (such as system 100 depicted in FIG. 1). The first user (610) is located within first real-world room (620). The boundaries of room (620) are defined according to step (510) depicted in FIG. 5 and described above. Real-world objects such as chair (630) may be located within room (620). The boundaries of objects such as chair (630) are defined according to step (520) depicted in FIG. 5 and described above. Room (620) may include walls such as left wall (640) and front wall (650) that are depicted in FIG. 6. An inter-user window (680) may be defined within room (620), such as in a designated portion of left wall (640) that is depicted in FIG. 6. Inter-user window (680) may be defined in accordance with step (530) as depicted in FIG. 5 and as described in this document.

A second user (not shown) is located in a second room (also not shown), which may be remote with respect to first room (620) (e.g., the first user may be located in a room in his or her home in a first city, and the second user may be located in a room in his or her home in a second city). The second user also performs steps (510), (520), and (530) in accordance with FIG. 5 and its accompanying description. Then, multi-player matchmaking is performed in accordance with step (540) of FIG. 5, resulting in the matching of the first user and the second user (as well as resulting in the "stitching" of the first room and the second room at the location of inter-user window 680). Subsequently, a mixed-reality multiplayer experience according to step (550) of FIG. 5 is initiated, which includes at least the first user and the second user, as described in this paragraph and in the preceding paragraph.

As a result of the actions described in the preceding two paragraphs, in certain embodiments, as depicted in FIG. 6, the first user may "see" not only a mixed-reality representation of first room 620 and objects such as object 630 that are located within first room 620, but also, through a virtual representation of inter-user window 680, a virtual representation of the second user (690) and a virtual representation of the second room (i.e., the room in which the second user is located). In addition, the first user may also see a virtual representation of objects located within the second room. For example, as shown in FIG. 6, an exemplary mixed-reality multi-player experience in accordance with aspects of the present invention in certain embodiments may comprise a first-person shooter game in which the first user and the second user are tasked with battling monsters. In such embodiments, first user 610 may see a virtual representation of second user 690 through inter-user window 690 that appears to be a fellow fighter of monsters.

Conversely, the second user 690 (who also be wearing a head-mounted mixed-reality display device), through his or her own version of inter-user window 680 (which may appear to the second user 690 to be located on a right-side wall of the second room, as opposed to left-hand wall 640 in the example shown in FIG. 6), may see a virtual representation of first user 610, of portions of first room 620, and of objects within first room 620 such as chair 630. For example, chair 630 may appear to the second user 690 as a rectangular prism (e.g., a box) of approximately the same size as chair 630 and at approximately the same location as chair 630 relative to first room 620 and to first user 610. As another example, a virtual representation of first user 610 may appear to the second user 690 as another fellow fighter of monsters, moving around a virtual representation of first room 620 in accordance with the actual movements of first user 610.

Still referring to FIG. 6, as part of the mixed-reality multi-player experience in accordance with certain embodiments of the present invention, both the first player 610 and the second player would "see" other elements of the experience, such as the virtual version of a monster (670) depicted in FIG. 6. First user 610 would perceive the virtual version of monster (670) as appearing at a location beyond the boundaries of front wall 670 of first room 620, and the second user 690 would also perceive a virtual version of monster 670 as appearing at a location beyond the front wall the second room (i.e., the room in which the second user 690 is located). Notably, the virtual version of monster 670, as well as all other virtual objects displayed to both the first user 610 and the second user 690, would appear to be located in the same location and move in the same way in the shared virtual world created by the stitching process of the first room and the second room as described herein. Thus, for example, both the first user and the second user 690 may be firing projectiles at virtual monster 670 with their respective virtual weapons, and the second user 690 may observe the actions performed by a virtual representation of first user 610 as well as the actions of firing of the projectiles by the first user and the effect of these actions on virtual monster 670. Conversely, the first user may observe the actions performed by a virtual representation of the second user 690 as well as the actions of firing of the projectiles by the second user 690 toward virtual monster 670, and the effect of these actions on virtual monster 670. In this way, for example, first user 610 and the second user 690 may cooperate in fighting virtual monster 670, and first user 610 and the second user 690 may perceive as part of the immersive experience according to aspects of the present invention in certain embodiments that he or she is cooperating in real-time with the task of fighting against real-world monster 670 in their shared mixed-reality virtual space. As another example, first user 610 may "throw" a virtual object such as a grenade or an ammunition pack through inter-user 680, such that the second user 690 would see and perceive these actions as actually occurring in the users' shared mixed-reality space, such that the second user 690 may catch the virtual objects thrown by the first user 610.

While the interactive shared mixed reality possibilities are vast, an additional example may include the first user 610 firing projectiles from his or her weapon through inter-user window 680, such that the second user 690 sees and perceives the effects of these projectiles (e.g., first user 610 may intentionally or accidentally shoot projectiles at the second user 690, or vice versa). As an additional example, virtual monster 670 may fire projectiles at first user 610 such that the second user 690 sees and perceives these actions and their effects through his or her own side of inter-user window 680. As another example, virtual monster 670 may appear to fire a projectile through the first room 620 and through inter-user window 680, ending up in a virtual representation of the second room (in which the second user 690 is located), such that the first user 610 and the second user 690 both see and perceive these actions and their effect in real-time as if they were occurring in a coordinated manner throughout the mixed-reality space shared by the first user 610 and the second user 690. As another example, virtual monster 670 may appear to enter first room 620, in a manner visible to both the first user 610 and the second user 690, and the second user 690 may fire projectiles through the intra-user window 680 into the virtual representation of first room 620 so as to assist with fighting monster 670. As another example, multiple users may be physically present in first room 620 and/or in the second room, and, in certain embodiments according to aspects of the present invention, the movements and actions of all such users are tracked and reflected in the mixed-reality multi-player virtual space that is shared by all such users.

Aspects of the present invention in certain embodiments enable users to collaborate in unique and novel ways, as users are given the visual and auditory impression that another user's movements are projected onto a wall of the room in which that user is located, even though the two users may be located far apart from each other in the real world.

Figure 7:
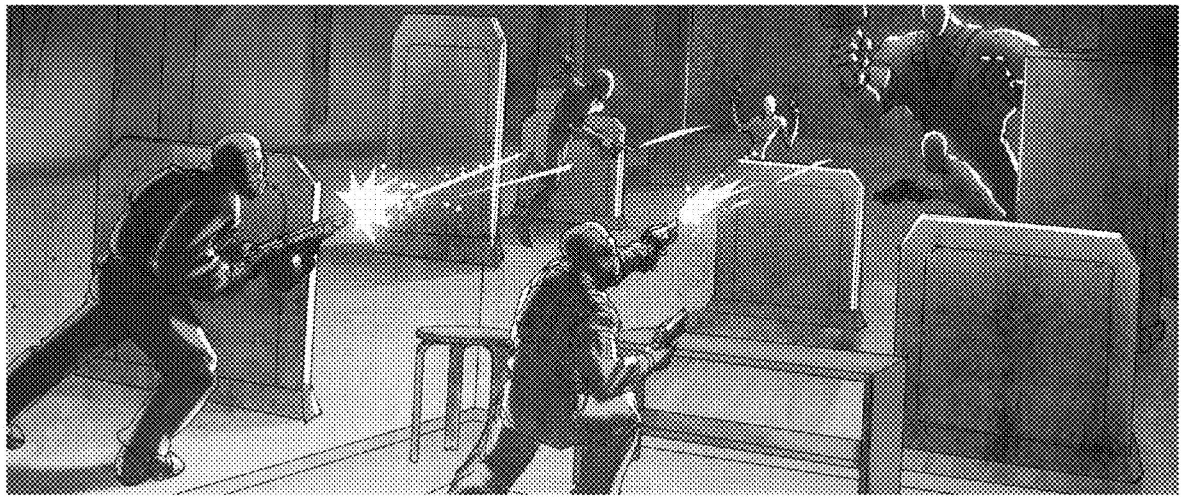
FIG. 7 depicts another exemplary arrangement utilizing aspects of the present invention in certain embodiments.

FIG. 7 depicts another exemplary arrangement 700 utilizing aspects of the present invention in certain embodiments. As shown in FIG. 7, from the imaginary perspective of an observer behind multiple players of a mixed-reality multi-player experience such as that described above with reference to FIGS. 5 and 6, virtual representations of multiple users appear to be coordinated and collaborating in fighting virtual monsters located down-range from the users, such that multiple users appear to be located in the same mixed-reality virtual space although they may actually be located remotely from each other in the real world.

Figure 8:
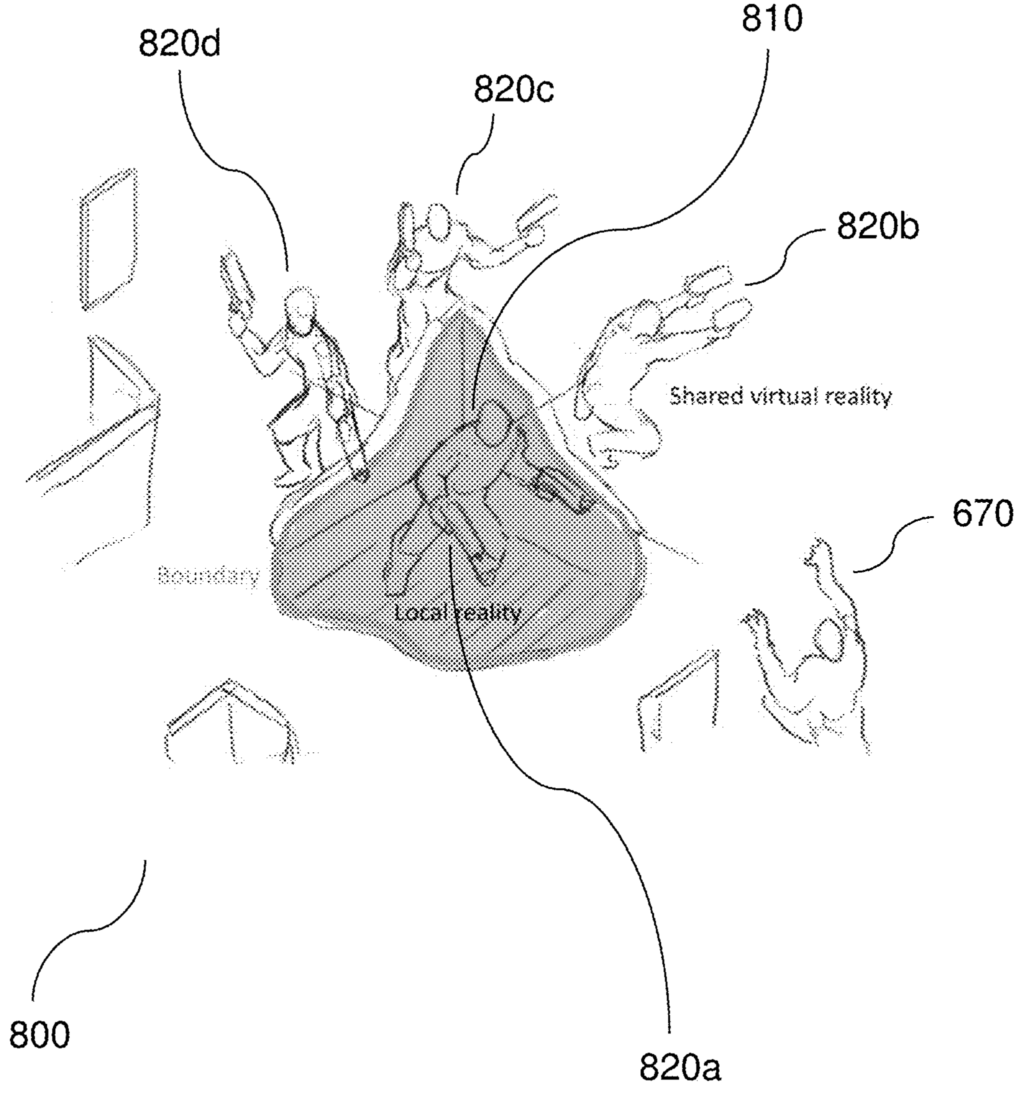
FIG. 8 depicts another exemplary arrangement utilizing aspects of the present invention in certain embodiments.

FIG. 8 depicts another exemplary arrangement 800 utilizing aspects of the present invention in certain embodiments. As shown in FIG. 8, an inter-user window (such as depicted in step 530 of FIG. 5 and described in the accompanying text) may alternatively be defined (instead of in a shared wall, as in the example of FIG. 6 that is described above) in a corner of a room, such that multiple users (such as the four virtual representations of users—820*a*, 820*b*, 820*c*, 820*d*—shown in the center of FIG. 8) are matched into a shared mixed-reality virtual space that is stitched together at a corner they all share (810), such that, for example, the multiple users can all coordinate and collaborate in fighting virtual monsters (670).

In certain embodiments, the process of defining an inter-user window in accordance with step (530) of FIG. 5 consists of the following steps: First, a user points his or her mixed-reality controller (such as controller 130L or 130R depicted in FIG. 1) at multiple points on a wall located in a room in which the user is located (e.g., left-wall 640 depicted in FIG. 6). Two points may be defined in a direction toward a corner (such as corner 695 depicted in FIG. 6) from left wall 640. Two other points may be defined in a direction toward the same corner from another wall (such as front wall 650 depicted in FIG. 6). Then, the location of corner 695 is triangulated based on the information gathered by defining the points in accordance with the steps described in this paragraph. Then, the location of the "floor" of the room is defined according to techniques known to skilled artisans. Then, using a similar process, the other relevant walls of the room are defined, as well as the relevant objects within the room.

In certain embodiments, the minimum amount of information required for each user according to aspects of the present invention are four points within each user's physical room to calibrate the room position and orientation (or alternatively, origin or room boundary information may be provided using so-called guardian or chaperone systems used in commercially available systems VR, AR, or MR systems), as well as two additional points to define the position of intra-user window 680. Once this information has been collected, the virtual versions of two physical rooms may be stitched together into a single shared and combined virtual room. For example, a virtual version of the second room may be added or stitched to first room 620, using the position of the defined origin point as a reference, and this addition or stitching takes place by translating and/or rotating the virtual representation of the second room so that it becomes adjacent to first room 620 and connected to first room 620 such that intra-user window 680 is located in the same position within the users' shared virtual space.

Certain embodiments allow multiple users to align their play space with other users in different locations. For example, in certain embodiments, a player may map out the physical space around that player to use it as that player's play space. This includes, but is not limited to, mapping out walls, windows, doors, tables, chairs, and the like. For example, such embodiments proceed as follows:

1. The first player is positioned in the correct position relative to that player's play space.
2. Another player maps out the physical space around that other player, similar to the first player.
3. The players establish a connection with each other, and use their respective maps that they have created previously. These maps are then stitched together.
4. Players are able to see each other and their respective play spaces, including any and all objects that have been mapped out. Players are able to pass virtual objects between the play spaces as if they were located in the same physical location. Players are able to interact with objects in the other player's play space represented as a virtual object.
5. Virtual spaces outside of the player-created play spaces may be generated, with which the players are able to interact and act upon. Virtual objects are able to pass in from the virtual space to the player-created play spaces, and players are able to see and interact with these virtual objects on their own play space, and on the other player's play space.
6. The players are able to progress and complete tasks cooperatively, or compete against each other to progress or complete tasks as given by the application, by interacting with the virtual elements or by interacting with each other.

The process through which a player may map out his or her space is defined as a process that allows a player either directly or indirectly to mark out the layout and objects of the room that he or she is in. In certain embodiments, the information required for such layout marking may be provided by the application executing the audiovisual experience itself, or by the device that the application is running on, or by another device which allows the player to map out their space and share that information with the application.

For example, one way to implement the system is to use the room setup system commercially (e.g., the OpenXR Scene API) provided by Meta. That facility allows the player to map out his or her room, and that acquired map data can then be shared with the application to use as it needs. The application may create representations of the different objects that have been mapped out to visualize them to the player within the application.

An example of the process that players may take and how the application handles the system is as follows:

1. Player 1 maps out his or her objects in his or her physical space using any of the means previously mentioned.
2. The objects of Player 1 are then structured as children to a parent (root) object. The parent (root) object may be used as an arbitrary point in space, but may also be used as the origin point in which the position, orientation and scale of the objects are stored relative to the parent (root) object.
3. This information may be saved in a way that can be restored by the application without the user having to re-do the process.
4. Player 2 performs the same process steps 1-3.
5. Player 1 hosts a game that Player 2 can join.
6. Player 1 uses the objects created, or loads them from memory if they were previously saved.
7. Player 1 is positioned within the space to correctly replicate his or her position for other players.
8. Player 2 joins the session and uses his or her own objects previously created. If Player 2 does not have the authority to create his or her objects in a networked session, he or she may send the saved data about the setup to Player 1, either manually or automatically.
9. The application receives the data from Player 2 and creates a new root object and recreates the setup of objects relative to the root object.
10. Player 2 is positioned relative to the root object created for Player 2, allowing positioning within that space to correctly replicate for Player 1.
11. The application handles the calculation of space and movement within the space to correctly determine the position and orientation of players moving within their designated space.
12. To stitch together the newly created rooms, an object (like a wall) may be designated now, if not previously designated. This is used to represent the starting point from where the other player's room will extend.
13. The rooms are moved around to align using the designated object. If a wall has been used, it can be visual modified in the virtual world to create an opening between the rooms so players may see each other beyond the wall.
14. At this point, the application may create virtual objects and place them around the rooms or create openings for virtual objects to enter the rooms.

While the above description contains many specifics and certain exemplary embodiments have been described and shown in the accompanying drawings, it is to be understood that such embodiments are merely illustrative of, and not restrictive on, the broad invention, and that this invention is not to be limited to the specific constructions and arrangements shown and described, since various other modifications may occur to those ordinarily skilled in the art, as mentioned above. The invention includes any combination or sub-combination of the elements from the different species and/or embodiments disclosed herein.

What is claimed is:

1. A computer-implemented method for generating a shared multi-user mixed reality environment, comprising:

receiving a first set of room boundary data parameters associated with a first mixed-reality headset user located in a first physical room;

receiving a first set of inter-user window definition data parameters associated with said first set of room boundary data parameters, wherein said first set of inter-user window definition data parameters defines the location of a first virtual inter-user window within said first physical room;

receiving a second set of room boundary data parameters associated with a second mixed-reality headset user located in a second physical room;

receiving a second set of inter-user window definition data parameters associated with said second set of room boundary data parameters, wherein said second set of inter-user window definition data parameters defines the location of a second virtual inter-user window within said second physical room; and performing multi-user matchmaking based on said first set of room boundary data parameters, said first set of inter-user window definition data parameters, said second set of room boundary data parameters, and said second set of inter-user window definition data parameters, wherein said multi-user matchmaking comprises virtually stitching together a virtual version of said first physical room with a virtual version of said second physical room at a location where said first virtual inter-user window and said second virtual inter-user window coincide at least in part, and wherein said virtually stitching comprises translating, rotating, or both translating and rotating said virtual version of said second physical room so that said virtual version of said second physical room becomes adjacent to and connected with said virtual version of said first physical room such that said second virtual inter-user window is co-located with said first virtual inter-user window in a shared virtual space, and wherein, after said virtually stitching, a portion of said virtual version of said second physical room is rendered visible to said first mixed-reality headset user through said first virtual inter-user window, and a portion of said virtual version of said first physical room is rendered visible to said second mixed-reality headset user through said second virtual inter-user window.

2. The method of claim 1, further comprising receiving a first set of object boundary data parameters associated with said first set of room boundary data parameters.

3. The method of claim 1, further comprising receiving a second set of object boundary data parameters associated with said second set of room boundary data parameters.

4. The method of claim 2, further comprising receiving a second set of object boundary data parameters associated with said second set of room boundary data parameters.

5. The method of claim 1, further comprising initiating a shared multi-user mixed-reality session, wherein a virtual representation of said second mixed-reality headset user, and a virtual representation of one or more objects located within said second physical room, are rendered visible to said first mixed-reality headset user through said first virtual inter-user window.

6. The method of claim 1, further comprising initiating a shared multi-user mixed-reality session, wherein a virtual object originating in the virtual version of said first physical room is configured to traverse said first virtual inter-user window and said second virtual inter-user window such that said virtual object becomes visible to said second mixed-reality headset user as having entered said virtual version of said second physical room.

7. A computer implemented system for generating a shared multi-user mixed reality environment, comprising:

one or more processors; and one or more non-transitory computer-readable storage media coupled to said one or more processors and storing instructions that, when executed by said one or more processors, cause said one or more processors to:

receive a first set of room boundary data parameters associated with a first mixed-reality headset user located in a first physical room;

receive a first set of inter-user window definition data parameters associated with said first set of room boundary data parameters, wherein said first set of inter-user window definition data parameters defines the location of a first virtual inter-user window within the first physical room;

receive a second set of room boundary data parameters associated with a second mixed-reality headset user located in a second physical room;

m receive a second set of inter-user window definition data parameters associated with said second set of room boundary data parameters, wherein said second set of inter-user window definition data parameters defines the location of a second virtual inter-user window within the second physical room; and performing multi-user matchmaking based on said first set of room boundary data parameters, said first set of inter-user window definition data parameters, said second set of room boundary data parameters, and said second set of inter-user window definition data parameters, wherein said multi-user matchmaking comprises virtually stitching together a virtual version of said first physical room with a virtual version of said second physical room at a location where said first virtual inter-user window and said second virtual inter-user window coincide at least in part, and wherein said virtually stitching comprises translating, rotating, or both translating and rotating said virtual version of said second physical room so that said virtual version of said second physical room becomes adjacent to and connected with said virtual version of said first physical room such that said second virtual inter-user window is co-located with said first virtual inter-user window in a shared virtual space, and wherein, after said virtually stitching, a portion of said virtual version of said second physical room is rendered visible to said first mixed-reality headset user through said first virtual inter-user window, and a portion of said virtual version of said first physical room is rendered visible to said second mixed-reality headset user through said second virtual inter-user window.

8. The system of claim 7, wherein said instructions further cause said one or more processors to receive a first set of object boundary data parameters associated with said first set of room boundary data parameters.

9. The system of claim 7, wherein said instructions further cause said one or more processors to receive a second set of object boundary data parameters associated with said second set of room boundary data parameters.

10. The system of claim 8, wherein said instructions further cause said one or more processors to receive a second set of object boundary data parameters associated with said second set of room boundary data parameters.

11. The system of claim 7, wherein said instructions further cause said one or more processors to initiate a shared multi-user mixed-reality session, wherein a virtual representation of said second mixed-reality headset user, and a virtual representation of one or more objects located within said second physical room, are rendered visible to said first mixed-reality headset user through said first virtual inter-user window.

12. The system of claim 7, wherein said instructions further cause said one or more processors to initiate a shared multi-user mixed-reality session, wherein a virtual object originating in said virtual version of said first physical room is configured to traverse said first virtual inter-user window and said second virtual inter-user window such that said virtual object becomes visible to said second mixed-reality headset user as having entered said virtual version of said second physical room.

* * * * *